United States Patent
Kosaka (10) Patent No.: US 9,417,581 B2
(45) Date of Patent: *Aug. 16, 2016

(54) IMAGE FORMING APPARATUS, POSITIONAL DEVIATION CORRECTION METHOD AND NON-TRANSITORY COMPUTER-READABLE STORAGE MEDIUM

(71) Applicant: BROTHER KOGYO KABUSHIKI KAISHA, Nagoya-shi, Aichi-ken (JP)

(72) Inventor: Raizo Kosaka, Konan (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/618,281

(22) Filed: Feb. 10, 2015

(65) Prior Publication Data

US 2015/0234336 A1    Aug. 20, 2015

(30) Foreign Application Priority Data

Feb. 17, 2014   (JP) ................. 2014-027635

(51) Int. Cl.
*G03G 15/00*   (2006.01)
*G06K 15/02*   (2006.01)

(52) U.S. Cl.
CPC .......... *G03G 15/5058* (2013.01); *G06K 15/027* (2013.01)

(58) Field of Classification Search
CPC .............. G03G 15/5062; G03G 15/04; G03G 15/04063; G03G 15/04054; G03G 21/206
See application file for complete search history.

(56) References Cited

U.S. PATENT DOCUMENTS 9,036,207 B2 * 5/2015 Kosaka ............... G06K 15/027
                                                         347/116
2011/0026044 A1   2/2011 Murayama

FOREIGN PATENT DOCUMENTS

| JP | 2010-2526 A    | 1/2010  |
| JP | 2011-33765 A   | 2/2011  |
| JP | 2011-197137 A  | 10/2011 |

* cited by examiner

*Primary Examiner* — David Gray
*Assistant Examiner* — Michael Harrison
(74) *Attorney, Agent, or Firm* — Merchant & Gould P.C.

(57) ABSTRACT

An image forming apparatus includes a control device configured to control an image forming device to form a pattern image for positional deviation correction configured by a plurality of marks, obtain a deviation value of an image formation position on the basis of a detection result of the pattern image detected by a sensor, and in response to a difference between a first deviation value obtained from a first combination of combinations of the marks configuring the pattern image and a second deviation value obtained from a second combination of which a number of the marks being smaller than the first combination is smaller than a defined value, determine the number of marks of the pattern image to be formed next time or later to a number smaller than the number of the marks of the first combination.

20 Claims, 6 Drawing Sheets

IMAGE FORMING APPARATUS, POSITIONAL DEVIATION CORRECTION METHOD AND NON-TRANSITORY COMPUTER-READABLE STORAGE MEDIUM

CROSS-REFERENCE TO RELATED APPLICATIONS

This application claims priority from Japanese Patent Application No. 2014-027635 filed on Feb. 17, 2014, the entire subject-matter of which is incorporated herein by reference.

TECHNICAL FIELD

The disclosure relates to an image forming apparatus. More specifically, the present invention relates to an image forming apparatus configured to execute positional deviation correction for correcting a positional deviation of an image, a positional deviation correction method and a non-transitory computer-readable storage medium.

BACKGROUND

There has been known a technology for enabling an image forming apparatus to execute positional deviation correction so as to prevent a positional deviation of an image. In the positional deviation correction, a pattern image for positional deviation correction configured by a plurality of marks is formed on a belt member for sheet conveyance, each of the marks is detected by a sensor and a deviation value is calculated on the basis of a detection result. When forming an image of a printing target, a position of the image is adjusted on the basis of a correction value corresponding to the deviation value.

As an example of the technology relating to the positional deviation correction, there has been disclosed a technology in which N marks are formed to calculate a deviation value and when a deviation value based on the (N−1) marks is smaller than a threshold value, a number of marks of a pattern image to be formed next time is set to be (N−1) and a consumption amount of toner is thus suppressed.

SUMMARY

Illustrative aspects of the present invention provide a technology capable of suppressing an influence of a magnitude of a deviation value and reducing a number of marks for an image forming apparatus configured to perform positional deviation correction.

According to one illustrative aspect of the present invention, there may be provided an image forming apparatus comprising: an image forming device configured to form an image; a conveyance member configured to convey the image formed by the image forming device; a sensor configured to detect the image to be conveyed by the conveyance member; and a control device configured to: control the image forming device to form a pattern image for positional deviation correction, the pattern image being configured by a plurality of marks; obtain a deviation value of an image formation position on the basis of a detection result of the pattern image detected by the sensor; and determine a number of marks of the pattern image to be formed next time or later, comprising: calculating a difference between a first deviation value, which is a deviation value obtained from a first combination of combinations of the marks configuring the pattern image, and a second deviation value, which is a deviation value obtained from a second combination of which a number of the marks is smaller than the first combination; determining whether the difference between the first deviation value and the second deviation value is smaller than a defined value; and in response to determining that the difference between the first deviation value and the second deviation value is smaller than the defined value, determining the number of marks of the pattern image to be formed next time or later to a number that is smaller than the number of the marks of the first combination.

DETAILED DESCRIPTION

<General Overview>

The above-described related-art technology has some disadvantages. That is, in the above-described related-art technology, the number of marks is increased or decreased depending on a magnitude of the deviation value. For this reason, it may be difficult to reduce the number of marks when the deviation value is large.

Therefore, illustrative aspects of the present invention provide a technology capable of suppressing an influence of a magnitude of a deviation value and reducing a number of marks for an image forming apparatus configured to perform positional deviation correction.

According to one illustrative aspect of the present invention, there may be provided an image forming apparatus comprising: an image forming device configured to form an image; a conveyance member configured to convey the image formed by the image forming device; a sensor configured to detect the image to be conveyed by the conveyance member; and a control device configured to: control the image forming device to form a pattern image for positional deviation correction, the pattern image being configured by a plurality of marks; obtain a deviation value of an image formation position on the basis of a detection result of the pattern image detected by the sensor; and determine a number of marks of the pattern image to be formed next time or later, comprising: calculating a difference between a first deviation value, which is a deviation value obtained from a first combination of combinations of the marks configuring the pattern image, and a second deviation value, which is a deviation value obtained from a second combination of which a number of the marks is smaller than the first combination; determining whether the difference between the first deviation value and the second deviation value is smaller than a defined value; and in response to determining that the difference between the first deviation value and the second deviation value is smaller than the defined value, determining the number of marks of the pattern image to be formed next time or later to a number that is smaller than the number of the marks of the first combination.

The image forming apparatus is configured to form a pattern image configured by the plurality of marks and to detect the pattern image by a sensor. The image forming apparatus is configured to obtain a deviation value of an image formation position on the basis of the detection result. When a difference between a first deviation value by a first combination of the marks configuring the pattern image and a second deviation value by a second combination of which a number of the marks is smaller than the first combination is smaller than a defined value, the image forming apparatus reduces a number of marks of the pattern image to be formed next time or later to a number smaller than the number of the marks of the first combination. For example, when the number of marks of the pattern image to be formed next time or later is set to the number of marks or larger of the second combination, it is possible to remarkably reduce the number of marks. Also, when the number of marks of the pattern image to be formed next time or later is set to a (number of marks−1) of the first combination, it is possible to reduce the number of marks while suppressing a change value of a correction value to be obtained from the deviation value. Also, the image forming device may be a color type or monochrome type. That is, the image forming device may be singular or plural. Also, a mark, which is a reduction target, may be a mark positioned at an end portion with respect to a conveying direction of the conveyance member or may be a mark positioned at an intermediate part.

That is, according to the image forming apparatus, when a difference between the first deviation value, which is obtained from the first combination of which the number of marks is large, and the second deviation value, which is obtained from the second combination of which the number of marks is small, is small, there is no large difference in the deviation values to be obtained even though the marks corresponding to a number smaller than the number of marks of the first combination are formed. Therefore, when a difference between both the deviation values is allowed, the number of marks to be formed next time or later is set to be smaller than the number of marks of the first combination, so that it is possible to reduce the number of marks, irrespective of a magnitude of the deviation value. That is, when the difference between the first deviation value and the second deviation value is smaller than the defined value, the number of marks is reduced. Therefore, when the difference between the first deviation value and the second deviation value is small, the number of marks can be reduced.

The control device may be configured to reduce a mark positioned at an upstream or downstream end with respect to a conveying direction of the pattern image in a case of forming the pattern image in the next controlling the image forming device to form the pattern image in accordance with the number of marks determined in the determining the number of marks.

The mark positioned at an upstream or downstream end with respect to the conveying direction is reduced to shorten an entire length of the pattern image in the conveying direction, so that it is possible to reduce an operating amount of the belt, the photosensitive member and the like.

In the determining the number of marks, the control device may be configured to determine a number of marks to be formed next time based on a plurality of differences using a third deviation value, which is a deviation value obtained from a third combination, a number of marks of the third combination being different from the first combination and the second combination.

The number of marks is determined on the basis of the more combinations, so that it is possible to determine a more appropriate number of marks. Incidentally, four or more combinations may also be provided, in addition to the third combination.

In the determining the number of marks, in a case where the difference is smaller than the defined value, the control device may be configured to determine the number of marks of the pattern image to be formed next time or later to a number of marks of the second combination, and in the controlling the image forming device to form the pattern image, in a case where a number of marks is determined in the determining the number of marks, the control device may be configured to control the image forming device to form the pattern image having the number of marks determined in the determining the number of marks with the same positional relation as the second combination.

The pattern image to be formed next time is preferably made to conform to the positional relation of the second combination used for the determination in the determination processing because it is possible to obtain an appropriate deviation value.

The image forming apparatus may be provided with a plurality of the image forming devices, and in the determining the number of marks, the control device may be configured to determine the number of marks for each of the plurality of image forming devices independently.

The number of marks is set to be different for each image forming device. Thereby, it is possible to set a number of marks suitable for each image forming device, so that it is possible to reduce more marks.

In the determining the number of marks, the control device may be configured to use different defined values for determining the number of marks for each of the image forming devices.

A user has a sensitive or insensitive sense to deterioration of an image quality with respect to each color. Therefore, it is preferably to provide a defined value for each image forming device. For example, since the user feels less uncomfortable about a positional deviation as regards yellow, as compared to black, the larger defined value may be set for yellow.

The control device may be configured to execute the determining the number of marks upon at least one of the image forming device and the conveyance member being replaced.

When the image forming device (for example, a photosensitive member or a process device including the photosensitive member) or conveyance member (for example, a conveyance belt) is replaced, there is a high possibility that a large positional deviation will occur. For this reason, when the corresponding member is replaced, it is preferably to re-determine the number of marks.

The control device may be configured to determine the number of marks of the pattern image to be formed next time or later to a number that is equal to or larger than the number of the marks of the second combination.

When the number of marks is set to the number of marks or larger of the second combination, it is possible to reduce the number of marks to be formed next time or later within a range in which the difference between the first deviation value and the second deviation value is small.

The control device may be configured to set an initial value of the number of marks of the first combination of the pattern image to a number corresponding to equal to or larger than a maximum period of a positional deviation variation.

When the number of marks is reduced after forming the marks to cover a maximum period becoming a variation cause of a mark position, it is possible to expect that a correct deviation value will be obtained.

The control device may be configured to set an initial value of the number of marks of the first combination of the pattern image to a number corresponding to equal to or larger than a period of a maximum amplitude of a positional deviation variation.

When the number of marks is reduced after forming the marks to cover a maximum amplitude becoming a variation cause of a mark position, it is possible to expect that a correct deviation value will be obtained.

Also, a control method and a computer program for implementing the functions of the image forming apparatus and a non-transitory computer-readable storage medium having the computer program stored therein are also novel and useful.

According to the illustrative aspects of the present invention, the technology capable of suppressing an influence of a magnitude of the deviation value and reducing the number of marks is implemented for the image forming apparatus configured to perform the positional deviation correction.

Illustrative Embodiments

Hereinafter, an illustrative embodiment of the image forming apparatus of the present invention will be described in detail with reference to the accompanying drawings. In this illustrative embodiment, the present invention is applied to a multi function peripheral (which will be abbreviated as MFP hereinafter) having a color image forming function.

Figure 1:
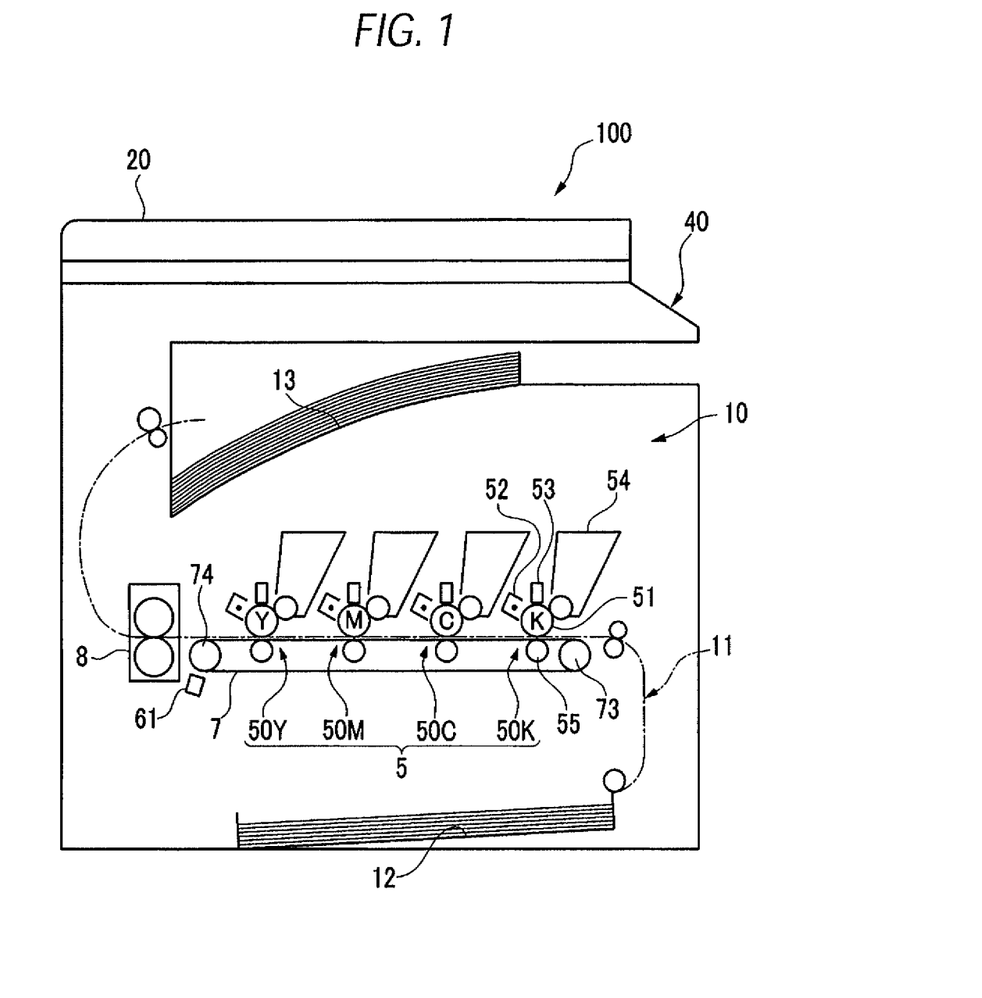
FIG. 1 is a sectional view illustrating a schematic configuration of an MFP according to an illustrative embodiment.

As shown in FIG. 1, the MFP 100 of this illustrative embodiment has an image forming device 10 configured to print an image on a sheet, a document reading device 20 configured to read an image of a document and an operation panel 40 configured to display an operating status and to receive a user's input operation.

The document reading device 20 is configured to read an image of a document while relatively moving a document and an image sensor. The moving method may be a method of moving the image sensor with the document being fixed or a method of moving the document with the image sensor being fixed. Also, the reading method may be a CIS method or CCD method. Also, the document reading device 20 may perform a color reading or only a monochrome reading.

The image forming device 10 has a process device 5 configured to form a toner image on the sheet by an electrophotographic method, a conveyance belt 7 configured to convey the sheet to a position facing the process device 5, and a fixing device 8 configured to fix a toner image, which has not been fixed yet on the sheet, on the sheet. The process device 5 has the same configurations for each color of yellow, magenta, cyan and black, which are aligned along one side (an upper side in FIG. 1) of the conveyance belt 7.

The process device 5 has a photosensitive member 51, a charging device 52, an exposure device 53, a developing device 54 and a transfer device 55, for each color. When forming an image, the MFP 100 charges a surface of the photosensitive member 51 by the charging device 52 and continues to expose the same by the exposure device 53. Thereby, an electrostatic latent image based on print data is formed on the surface of the photosensitive member 51. Also, the toner is supplied to the formed electrostatic latent image by the developing device 54, so that a toner image is formed on the photosensitive member 51.

Incidentally, in FIG. 1, regarding the configurations of the process device 5 for each color, reference numerals of a yellow part 50Y, a magenta part 50M, a cyan part 50C and a black part 50K are denoted. The arrangement and order of the configurations of the process device 5 for each color are not limited to the shown example, and any arrangement and order may be adopted.

The conveyance belt 7 is an endless belt wound on belt rollers 73, 74. As the belt rollers 73, 74 are rotated, the conveyance belt 7 is rotated in a counterclockwise direction of FIG. 1. The conveyance belt 7 is configured to convey the sheet on an outer periphery surface thereof from the process device 5 towards the fixing device 8.

Also, the MFP 100 has a conveyance path 11 of the sheet, a sheet feeding tray 12 configured to accommodate therein sheets for printing, and a sheet discharge tray 13 configured to discharge a printed sheet thereto. Upon printing an image on the sheet, the MFP 100 is configured to convey the sheet for printing from the sheet feeding tray 12 to the conveyance belt 7 via the conveyance path 11. The MFP 100 is configured to transfer the toner image formed on the photosensitive member 51 to the sheet being conveyed by the conveyance belt 7. Thereafter, the MFP 100 is configured to fix the toner image on the sheet in the fixing device 8. Further, the MFP 100 is configured to discharge the sheet having the image fixed thereon to the sheet discharge tray 13.

Figure 2:
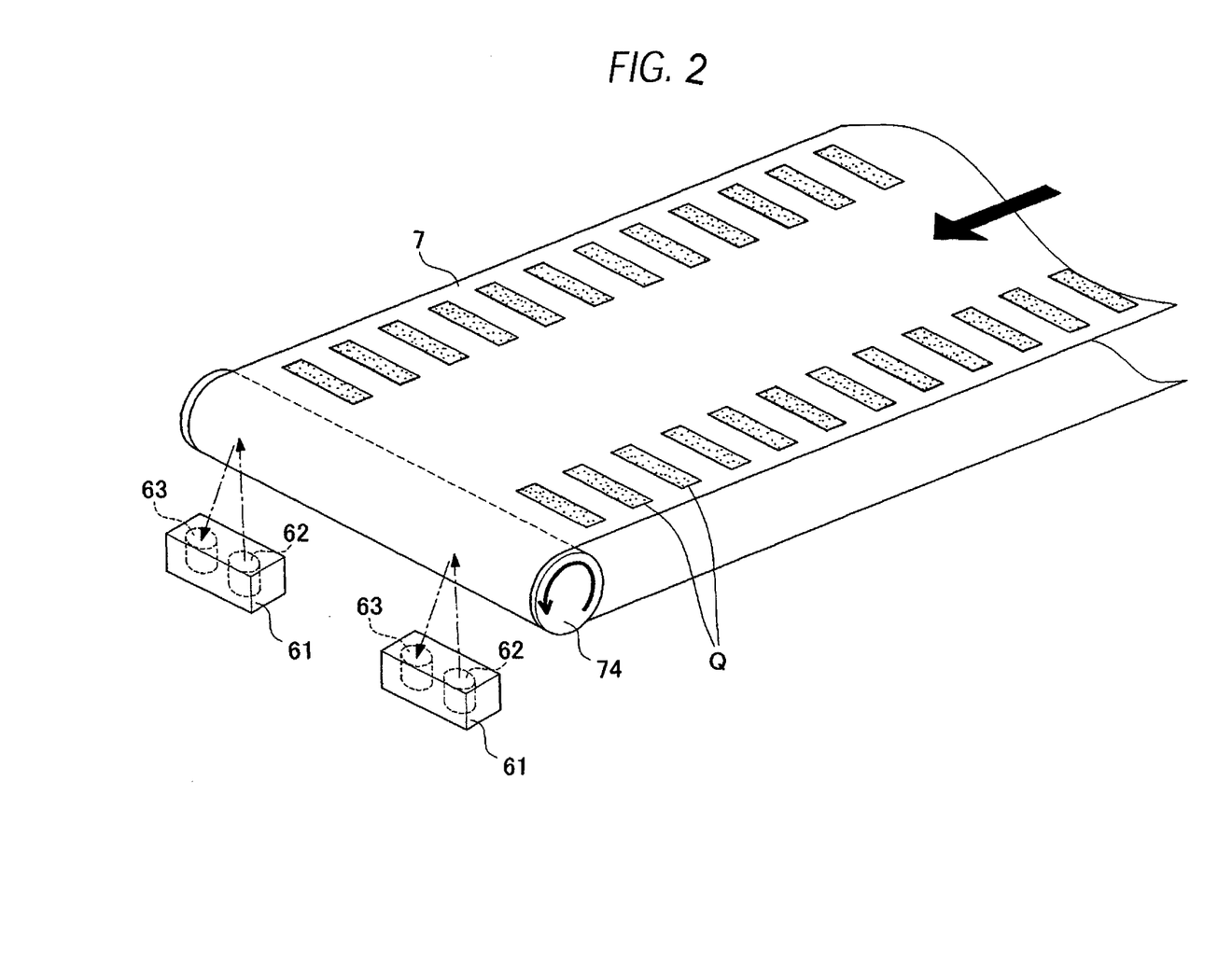
FIG. 2 illustrates an example of a pattern image and a mark sensor.

The MFP 100 of this illustrative embodiment has a mark sensor 61 configured to detect the toner image on the conveyance belt 7. The mark sensor 61 is a light reflection-type sensor having a light emitting device 62 and a light receiving device 63, as shown in FIG. 2, for example. The mark sensor 61 is configured to emit light from the light emitting device 62 and to receive light reflected on the conveyance belt 7 at the light receiving device 63. The MFP 100 is configured to detect the toner image on the conveyance belt 7, based on an amount of the received light.

As described later, the MFP 100 is configured to form a pattern image onto the conveyance belt 7 at the process device 5 and to convey the formed pattern image on the conveyance belt 7. The pattern image includes a plurality of marks Q, as shown in FIG. 2, for example. The MFP 100 is configured to detect the pattern image being conveyed on the conveyance belt 7 at the mark sensor 61. The process device 5 is an example of the image forming device, the conveyance belt 7 is an example of the conveyance member and the mark sensor 61 is an example of the sensor.

Figure 3:
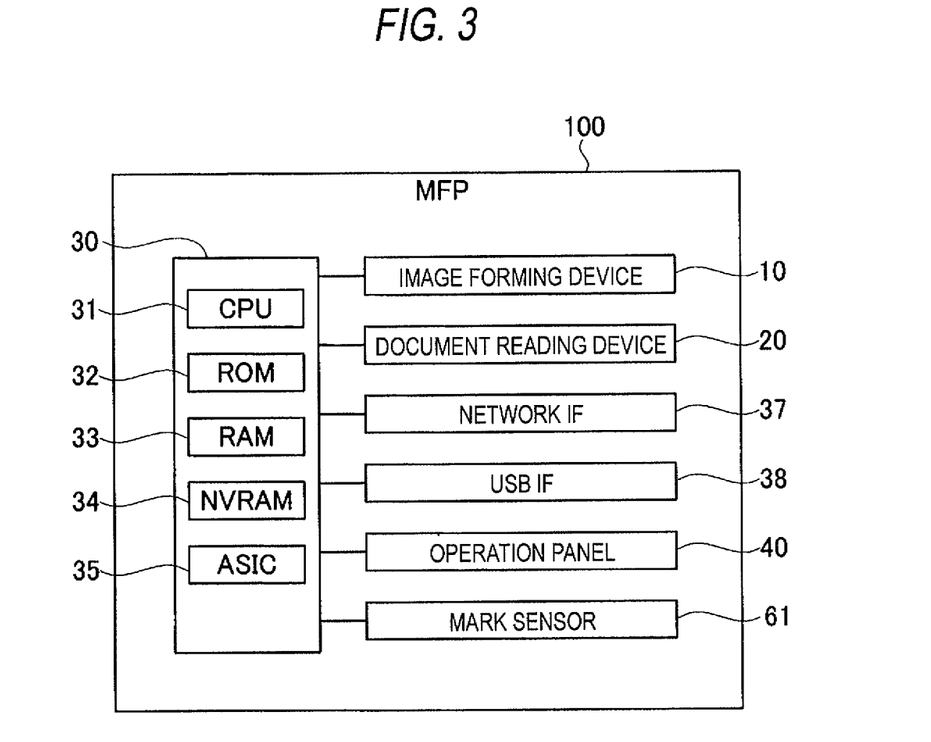
FIG. 3 is a block diagram showing an electrical configuration of the MFP.

Subsequently, an electrical configuration of the MFP 100 is described. As shown in FIG. 3, the MFP 100 has a controller 30 including a CPU 31, a ROM 32, a RAM 33, an NVRAM (non-volatile RAM) 34 and an ASIC 35. In addition, the MFP 100 has the image forming device 10, the document reading device 20, a network interface 37, a USB interface 38, the operation panel 40 and the mark sensor 61, which are electrically connected to the controller 30.

The ROM 32 is configured to store therein various control programs for controlling the MFP 100, various settings, initial values and the like. The ROM 32 is an example of the storage medium. The RAM 33 is used as a work area from which the various control programs are read out or a storage area for temporarily storing therein image data. The CPU 31 is configured to store processing results in the RAM 33 or NVRAM 34 and to control the respective elements of the MFP 100, in response to the control programs read out from the ROM 32.

The CPU 31 is an example of the control device. Incidentally, the controller 30 or ASIC 35 may be the control device. Incidentally, the controller 30 of FIG. 3 is a generic term of the hardware used to control the MFP 100 and does not indicate the single hardware actually existing in the MFP 100.

The network interface 37 is hardware for performing communication with an apparatus connected through a network by using a LAN cable and the like. The USB interface 38 is hardware for performing communication with an apparatus connected through a USB cable and the like. Also, the operation panel 40 is configured to display a variety of displays to a user and to receive a user's instruction input.

Subsequently, positional deviation correction that is performed in the MFP 100 of this illustrative embodiment is described. A positional deviation is a deviation between an actually formed position of the toner image and an ideal position on control thereof. The positional deviation to be corrected includes a deviation with respect to an ideal position in a main scanning direction or sub-scanning direction and a deviation of relative positions between colors.

For this reason, the MFP 100 is configured to obtain a positional deviation value of an actual state for each of various positional deviations and to determine a positional deviation correction value on the basis of the obtained positional deviation values. Further, the MFP 100 is configured to store the determined positional deviation correction value in the NVRAM 34. Upon the image formation, the MFP 100 is configured to perform correction on the basis of the stored positional deviation correction value, thereby forming an image. That is, the MFP 100 is configured to correct an image formation position on the basis of the positional deviation value obtained in advance, thereby forming an image of which positional deviation is suppressed.

Upon obtaining of the positional deviation value, the MFP 100 is configured to form a pattern image for positional deviation correction and to detect a position of the formed pattern image. For example, the MFP 100 is configured to form a toner image of a pattern image for positional deviation correction by the process device 5 and to transfer the same to the conveyance belt 7, at a state where a sheet is not being conveyed to the conveyance belt 7. Then, the MFP 100 is configured to detect the pattern image formed on the conveyance belt 7 by the mark sensor 61. Specifically, as shown in FIG. 2, the MFP 100 is configured to form a pattern image configured by the plurality of marks Q on the conveyance belt 7 and to detect the formed pattern image by the mark sensor 61, thereby obtaining positions of the respective marks Q.

The pattern image shown in FIG. 2 is an image in which a plurality of marks Q, each of which has a band shape facing towards a direction orthogonal to the moving direction of the conveyance belt 7, is arranged at an interval in the moving direction of the conveyance belt 7. The shape of each mark Q is not limited thereto. For example, the mark may have a shape oblique to the moving direction of the conveyance belt 7 or may have a combined shape of the oblique band shape and the orthogonal band shape. By the combined shape, it is possible to detect the positional deviations in both the main scanning direction and the sub-scanning direction. Incidentally, the mark Q may be arranged at any position in the direction orthogonal to the moving direction of the conveyance belt 7, at which it can be detected by the mark sensor 61.

The MFP 100 is configured to obtain a difference between the detected position of each mark Q and a reference position, which is an ideal position on control of the mark Q, based on the detection result of the mark sensor 61. In the example of FIG. 2, a distance between the detected position of each mark Q and the reference position is denoted with a plus or minus symbol and is thus numerically converted in accordance with a direction of the deviation, so that it is possible to obtain a positional deviation value for each mark Q. There is a high possibility that the positional deviation value will have a different value for each mark Q.

A variety of dynamic variations are added to a static positional deviation on control, so that a toner image is positionally deviated. The dynamic variations include (1) rotational unevenness due to eccentricity of the photosensitive member 51, (2) rotational unevenness of the belt roller 73 or 74, and (3) belt thickness unevenness of the conveyance belt 7, for example. Since the dynamic variations have periodicities having different periods, respectively, an entire dynamic variation obtained by composing the dynamic variations also has a constant periodicity. Therefore, when the marks Q are formed within a range of one period or larger of the dynamic variation, the positional deviation values of the respective marks Q are obtained and a positional deviation correction value is determined by setting an average value of the positional deviation values as a positional deviation value, it is possible to reduce an influence of the dynamic variation on the determined positional deviation correction value.

Regarding the three dynamic variations (1), (2) and (3), it is known that a variation period of the dynamic variation (3) is longest, from lengths of the periods becoming causes of the dynamic variations. That is, when the marks Q are formed within a range of one period of the dynamic variation (3) and a positional deviation correction value is determined on the basis of the positional deviation values of the marks, it is easy to cover the entire periodic dynamic variations. For this reason, it is supposed that a correction value having high reliability will be obtained. On the other hand, if many marks Q are formed, a used amount of toner, which is consumed to form the marks Q, and a number of rotations of the photosensitive member 51 are increased, which may influence the lifespan of the MFP 100.

Figure 4:
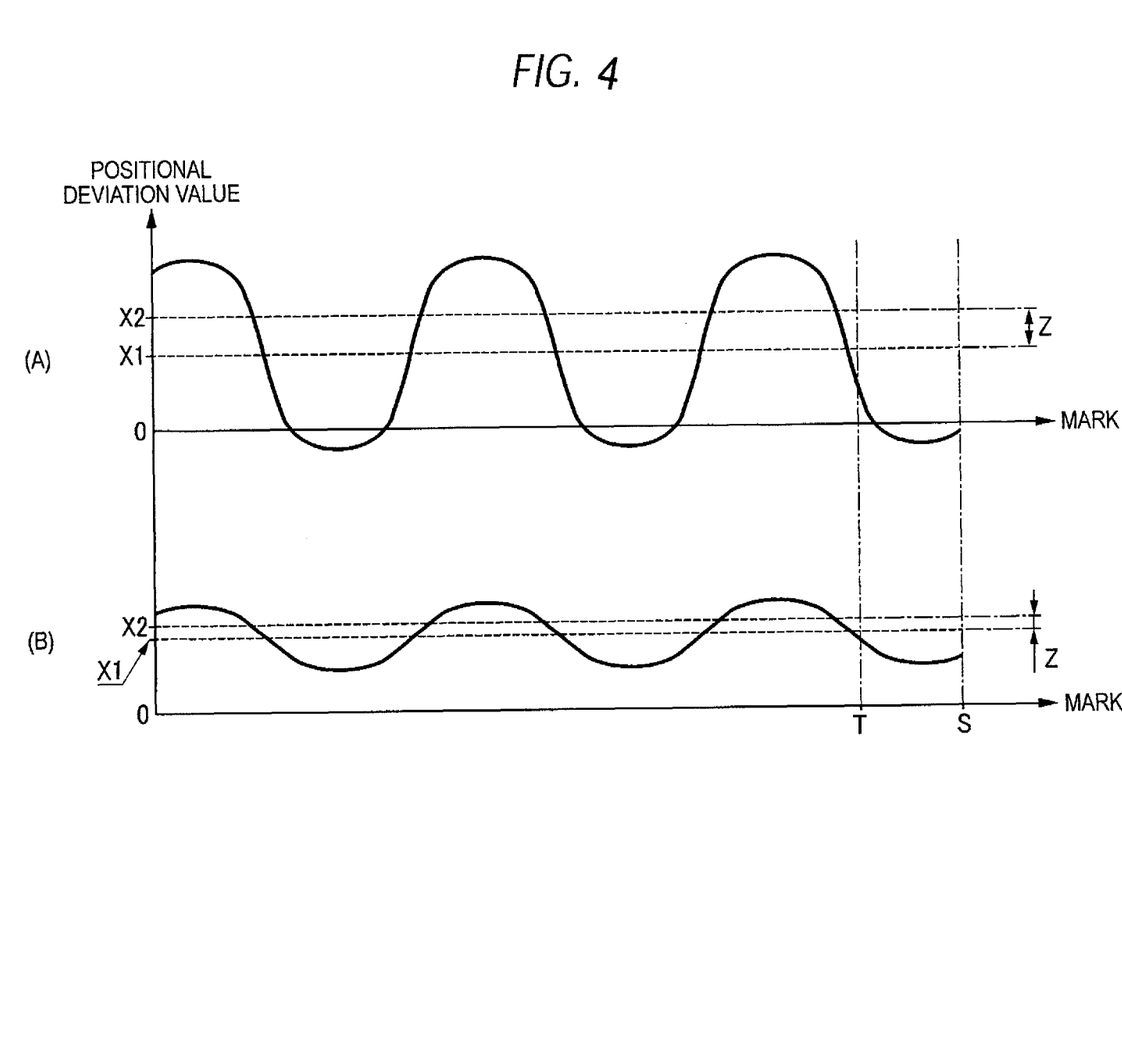
FIG. 4 illustrates an example of a positional deviation value.

Since the dynamic variation is highly influenced by component or mounting precision, a magnitude of the dynamic variation has an individual difference, depending on the MFP 100. Here, FIG. 4 shows an example of a variation of the positional deviation value in an apparatus (A) having large dynamic variation and an apparatus (B) having small dynamic variation. Incidentally, regarding the component or mounting precision, since the change thereof due to the using is little caused in an individual completed product, the individual difference is kept even if the using is repeated. On the other hand, when the process device 5 or conveyance belt 7 is replaced, there is a high possibility that the magnitude of the dynamic variation will be changed.

In FIG. 4, the positional deviation values of a total of S marks Q are indicated by a simplified model. The number S corresponds to the range of one period of the dynamic variation (3), for example. In the MFP 100, an overall positional deviation value based on the positional deviation values obtained by forming the S marks Q and a positional deviation correction value determined on the basis of the positional deviation value are values of high reliability, irrespective of the magnitude of the dynamic variation.

In the apparatus (B) having small dynamic variation, even when the positional deviation value is determined by the marks Q smaller than the number S, there is a possibility that a positional deviation correction value of relatively high precision will be obtained. That is, in the apparatus (B) having small dynamic variation, it is possible to expect that even when the number of marks Q to be formed for obtaining of a positional deviation value is reduced, an influence thereof on an image quality is small. On the other hand, in the apparatus (A) having large dynamic variation, when the number of marks Q is reduced, it may have a great influence on a positional deviation value, which is an average value, and a positional deviation correction value based on the positional deviation value.

Therefore, the MFP 100 of this illustrative embodiment is configured to form the marks Q corresponding to the predetermined initial value S and to compare a positional deviation value obtained on the basis of detection results of the entire number (S) and a positional deviation value obtained on the basis of detection results of the marks Q smaller than the number S. When a difference therebetween is smaller than a defined value, the MFP 100 limits the number of marks Q to be formed next time or later. Incidentally, the initial value S, which is the number of marks, is set to a number corresponding to equal to or larger than one period of a variation having a maximum period of the dynamic variations, for example. Specifically, the marks Q corresponding to the range of one period of the dynamic variation (3) are formed.

As shown in FIG. 4, the MFP 100 is configured to calculate an average value of positional deviation values, each of which is a difference between the detected position of each mark Q and the reference position, based on detection results of the total number S of marks Q, and to set the same as a first deviation value X1. Then, the MFP 100 is configured to calculate an average value of positional deviation values, based on detection results of a total number T of marks Q, which is smaller than the total number S, and to set the same as a second deviation value X2. Also, the MFP 100 is configured to calculate a difference Z=|X2−X1| between the first deviation value X1 and the second deviation value X2.

In the apparatus (B) having small dynamic variation, a difference of the positional deviation values for each mark Q is small and a value of the difference Z is not so large. On the other hand, in the apparatus (A) having large dynamic variation, since the positional deviation value is largely different for each mark Q, the difference Z is larger, as compared to the apparatus (B). Therefore, when the calculated difference Z is smaller than the defined value, the number of marks Q to be formed upon next calculation and thereafter of a positional deviation correction value is set to a number smaller than the initial value S and equal to or larger than the number T used for calculation of the second deviation value. In this case, the total number S is an example of the first combination, and the number T is an example of the second combination.

When obtaining the number T, the MFP reduces the number of marks Q used for calculation of the second deviation value X2 from the number S by one and then calculates the difference Z. When the calculated difference Z is smaller than the defined value, the MFP further reduces the number of marks Q by one. In this way, the MFP is configured to calculate the difference Z while reducing the number of marks Q by one and to set a minimum number at which the difference Z is not equal to or larger than the defined value as the number T. That is, the MFP is configured to determine the number T on the basis of the plurality of differences Z obtained from the plurality of marks Q smaller than the number S. In this case, the plurality of marks is an example of the third combination.

In this illustrative embodiment, the MFP 100 is configured to form the S marks Q, to determine the number T as described above and to store the same in the NVRAM 34. In next processing and thereafter for obtaining the positional deviation value, the MFP is configured to read the number T from the NVRAM 34, to form the T marks Q and to obtain positional deviation values. Also, the MFP is configured to obtain a positional deviation correction value to be used for next image formation and thereafter, based on the obtained positional deviation values.

Positions at which the T marks Q are formed upon next obtaining of a positional deviation value are determined as follows. For example, a mark Q, which is positioned at an upstream or downstream end with respect to the moving direction of the conveyance belt 7, of the arrangement of the total number S of marks Q is reduced. Alternatively, a mark may be arbitrarily picked out from the total number S of marks Q, so that the arrangement may be changed to the arrangement of the total number T of marks Q. For example, a central mark Q may be reduced from the S marks or a mark may be reduced every second or every third. At this time, it is preferably to reduce the mark from an end portion with respect to the moving direction of the conveyance belt 7, because it is possible to reduce not only a used amount of toner and but the rotation number of the conveyance belt 7 and the rotation number of the photosensitive member.

Incidentally, when the number T is determined by reducing the mark Q from a place other than the end portion, it is preferably to store a position of the mark Q, which is used to determine the number T, of the S marks Q. Also, when obtaining a positional deviation value next time or later, the marks Q are formed so that the same arrangement as the stored positional relation is made.

That is, a positional deviation value obtaining operation that is executed by the MFP 100 includes a first operation of forming the total number S of marks Q, which is a large number, and a second operation of forming the T marks Q, which is a small number. The number T of marks Q that is formed in the second operation is determined upon execution of the first operation.

The MFP 100 is configured to execute the first operation after a situation, which may have a great influence on the magnitude of the dynamic variation, occurs such as first correction value obtaining after the MFP 100 is manufactured and replacement of the process device 5 or the conveyance belt 7. Also, the MFP executes the first operation when a user's instruction to execute a color deviation correction and the like is received, too. On the other hand, for example, after a predetermined number of sheets is printed from the previous obtaining of the positional deviation correction value, after predetermined time elapses, when main power is input and after an environmental change is detected, the MFP is configured to execute the second operation. Therefore, a frequency of executing the first operation of forming the large number of marks Q is smaller than a frequency of executing the second operation.

Figure 5:
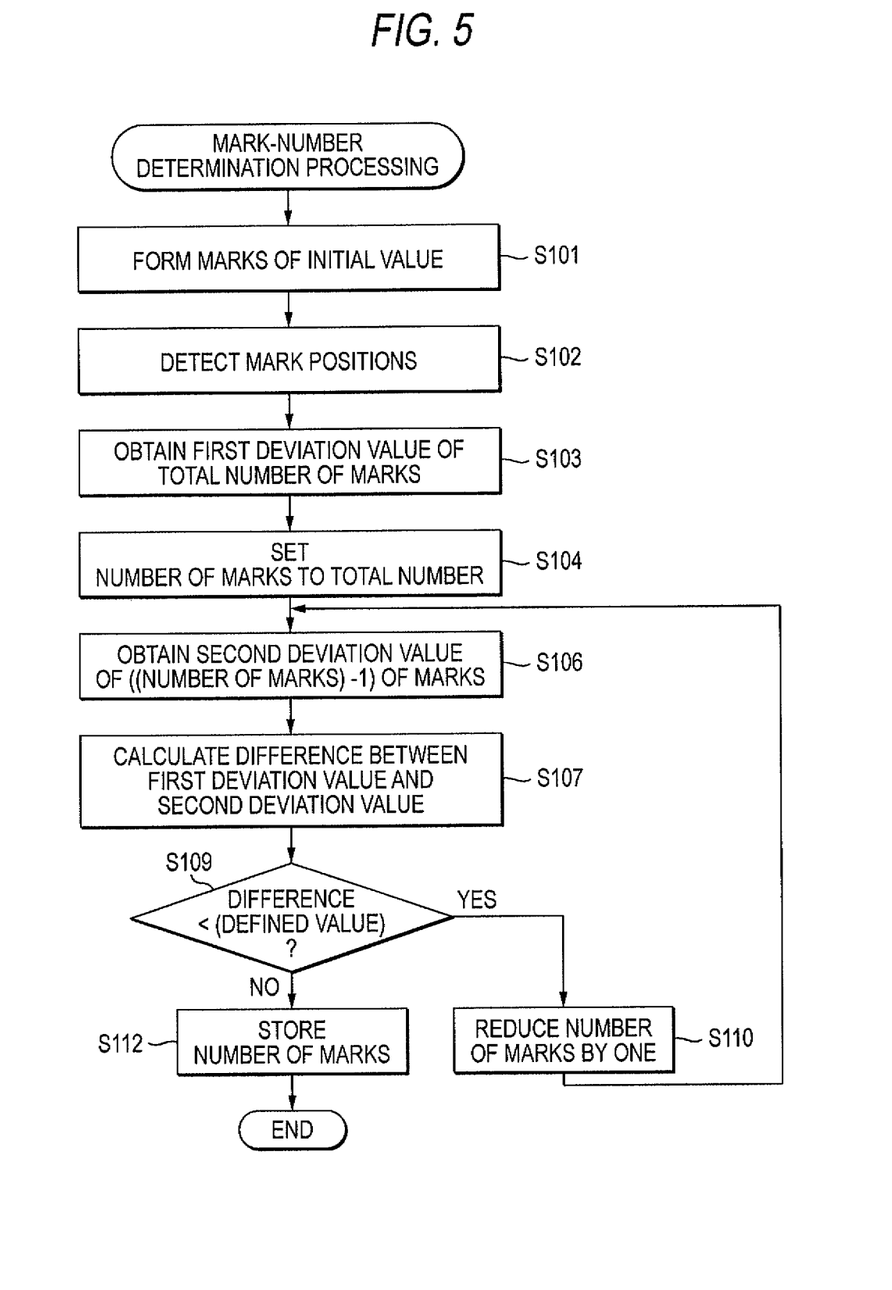
FIG. 5 is a flowchart showing a sequence of mark-number determination processing.

Subsequently, a sequence of mark-number determination processing of determining the number T of marks Q of the pattern image, which is implemented in the MFP 100 of this illustrative embodiment, is described with reference to a flowchart of FIG. 5. The mark-number determination processing is executed by the CPU 31 when the above-described execution condition of the first operation is satisfied. Incidentally, since the MFP 100 is configured to execute the positional deviation correction for each color of the process device 5, the mark-number determination processing is executed for each color. Incidentally, when executing the mark-number determination processing for each color, the MFP 100 may collectively form the marks Q of the respective colors and execute the processing in parallel or may execute the processing separately for each color.

In the mark-number determination processing, the pattern image configured by the marks Q corresponding to the number S, which is the initial value of the number of marks, is formed on the conveyance belt 7 by the image forming device 10 (S101). The initial value S is the number of marks to be formed within a range corresponding to one circulation of the conveyance belt 7.

Then, the position of each of the formed marks Q is detected by the mark sensor 61 (S102). Also, based on the positions of the respective marks Q detected in S102, the first deviation value X1, which is the positional deviation value of the total number S of marks Q, is obtained (S103). Specifically, an average value of the positional deviation values of the respective marks Q is obtained and set as the first deviation value X1. Also, the number of marks, which is a variable indicating the number of marks to be determined, is set to the total number S (S104).

Then, (the number of marks−1) of marks Q of the pattern image formed in S101 is used to calculate an average value, like S103, and the second deviation value X2 is thus obtained (S106). Also, a difference Z between the first deviation value X1 obtained in S103 and the second deviation value X2 obtained in S106 is calculated (S107).

Then, it is determined whether the difference Z calculated in S107 is smaller than the predetermined defined value (S109). When it is determined that the difference Z is smaller than the defined value (S109: YES), the number of marks is subtracted by one (1) (S110), and the processing returns to S106.

That is, the second deviation value X2 of the number of marks Q, which is further smaller by one than the number of marks obtained by the one-subtraction in S110, is calculated, and a difference Z between the new second deviation value X2 and the first deviation value X1 is calculated and compared with the defined value. When it is determined that the difference Z is smaller than the defined value, the MFP 100 reduces the number of marks by one and repeats S106, S107, S109 and S110.

On the other hand, when it is determined that the difference Z is not smaller than the defined value (S109: NO), the number value of marks at that time is determined as the number T of marks Q in the next second operation and thereafter. Also, the determined number T is stored in the NVRAM 34 (S112) and the mark-number determination processing is then over.

Incidentally, the respective arrangements of the marks Q reduced in S106, except for a case where the positions of the reduced marks Q are all the end portion, are stored in the NVRAM 34 together with the number T. For example, what order the position of the reduced mark Q is from the upstream end is stored. Alternatively, the arrangement of the remaining marks after the reduction may be stored. When the mark is all reduced from the end portion, the arrangement may not be stored.

When executing the mark-number determination processing for each color, the defined value, which is compared with the difference in S109 of the processing, may be different for each color. The reason is that a notable shape of the positional deviation is different by the color. For example, the defined value for yellow is set to be larger than the defined value for black. By doing so, since the difference for yellow is allowed to a range of values larger than the difference for black, there is a high possibility that the number of marks can be more reduced for yellow. That is, there is a possibility that the number T of marks Q to be determined in the mark-number determination processing will also be different for each color. In this case, although the positional deviation correction precision for yellow may be lowered, since the positional deviation of yellow is not conspicuous well, there is no particular practical issue.

Incidentally, when executing the mark-number determination processing, the average value by the total number S of marks Q is set as the positional deviation value and the positional deviation correction value is calculated. The calculated positional deviation correction value is stored in the NVRAM 34. When forming an image up to the next correction value obtaining processing, the correction value is used to correct an image formation position. Specifically, an image of which a positional deviation is reduced by deviating a timing of image formation at each scanning line of an image in a direction opposite to the deviation by a time period corresponding to the obtained positional deviation correction value is formed. For example, the image formation position is adjusted by adjusting the exposure starting timing of the exposure device 53.

For example, in the MFP 100 including the exposure device 53 having a laser light emitting device and a polygon mirror, when an illumination timing of laser light to the polygon mirror is adjusted, an image formation position can be adjusted with respect to the direction orthogonal to the moving direction of the conveyance belt 7. Also, in the MFP 100 including the exposure device 53 having an LED light emitting device, when a lighting timing of the LED light emitting device is adjusted, an image formation position can be adjusted with respect to the moving direction of the conveyance belt 7, and when an LED to be turned on is changed, an image formation position can be adjusted with respect to the direction orthogonal to the moving direction of the conveyance belt 7. Also, for example, when the moving speed of the conveyance belt 7 or rotating speed of the photosensitive member 51 is adjusted, an image formation position can be adjusted with respect to the moving direction of the conveyance belt 7.

Also, when the above-described execution condition of the second operation is satisfied after executing the mark-number determination processing and the positional deviation correction value obtaining, correction value update processing of newly obtaining and updating the positional deviation correction value is executed. A sequence of the correction value update processing is described with reference to a flowchart of FIG. 6. The correction value update processing is executed by the CPU 31 when the execution condition of the second operation is satisfied.

Figure 6:
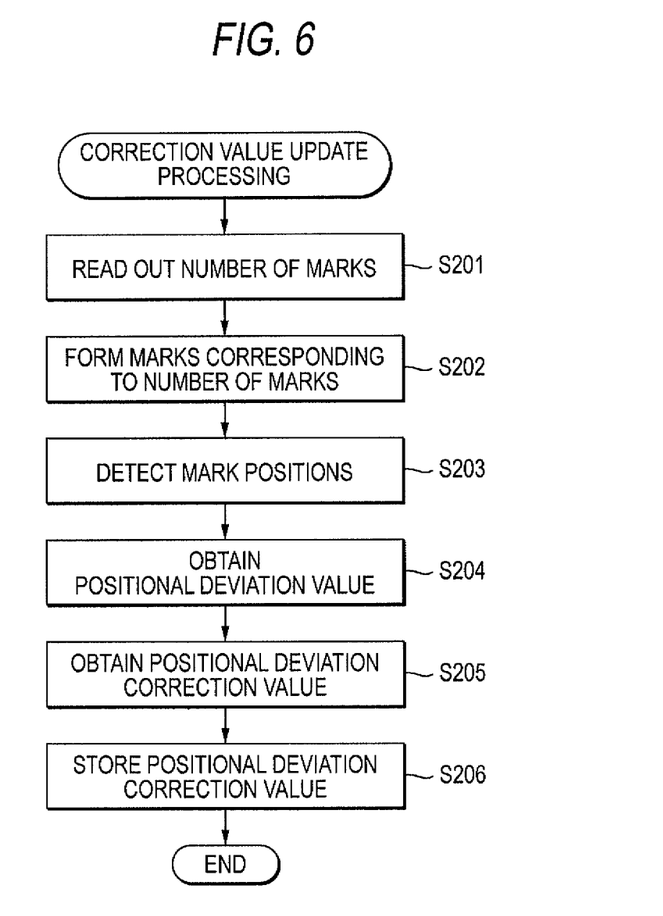
FIG. 6 is a flowchart showing a sequence of correction value update processing.

In the correction value update processing, the number of marks stored in the NVRAM 34 is first read out (S201). That is, the number T of marks determined in the above-described mark-number determination processing and stored in S112 of FIG. 5 is read out. When the arrangement of marks is also stored together with the number T of marks, the arrangement is also read out. Then, the marks Q corresponding to the read number T of marks are formed on the conveyance belt 7 in conformity to the read arrangement (S202). When the arrangement is not stored, the T marks Q are sequentially formed from an end portion.

Each of the formed marks Q is detected by the mark sensor 61 (S203). Also, based on the detection result of the mark sensor 61, a position of each mark Q is obtained and a positional deviation value of each mark Q is obtained (S204). Also, based on the obtained positional deviation values of the respective marks Q, an average value thereof is calculated to obtain a correction value for positional deviation correction (S205). Then, the obtained positional deviation correction value is stored in the NVRAM 34 (S206) and then the correction value update processing is over.

In the correction value update processing, since the marks Q corresponding to the number T determined in the previous mark-number determination processing are formed, the number of marks to be formed is smaller, as compared to the correction value obtaining processing by the total number S of marks Q. That is, it is possible to obtain the positional deviation correction value with the used amount of toner smaller than the first operation. Incidentally, when forming an image after the correction value update processing, the correction is performed on the basis of the positional deviation correction value stored this time.

As specifically described above, according to the MFP 100 of this illustrative embodiment, the pattern image for positional deviation correction by the S marks Q is formed on the conveyance belt 7 and the formed marks Q are detected by the mark sensor 61. Also, based on the detection result, the positional deviation values of the respective marks Q are obtained and the first deviation value, which is the positional deviation value by the S marks, is obtained from the positional deviation values. The difference between the first deviation value and the second positional deviation value, which is the positional deviation value by the marks Q corresponding to a number smaller than the number S, is calculated. When the difference is smaller than the defined value, the number T of the marks Q of the pattern image to be formed next time or later is determined. That is, in the MFP 100 having small dynamic variation, the difference Z is small when the number of marks is reduced. Therefore, upon the subsequent obtaining of the positional deviation correction value, it is possible to obtain the positional deviation correction value having high reliability even when the number of marks is reduced. That is, it is possible to reduce the number of marks while suppressing the influence of the magnitude of the positional deviation value.

Incidentally, the above-described illustrative embodiment is just an exemplary and is not construed to limit the present invention. Therefore, the present invention can be variously improved and modified without departing from the gist thereof. For example, the present invention is not limited to the MFP and can be applied to any apparatus inasmuch as it has an image forming function, such as a copier, a FAX apparatus and the like.

In the above-described illustrative embodiment, the number S, which is the initial value, is set to the number corresponding to one circulation of the conveyance belt 7. However, the present invention is not limited thereto. For example, the initial value may be set to a number corresponding to equal to or larger than a range of one circulation, based on a period of the variation having the maximum amplitude of the various dynamic variations that may influence the positional deviation correction value of the MFP 100.

In the above-described illustrative embodiment, in the mark-number determination processing, the difference Z is calculated while reducing the number of marks by one. However, the number to be reduced is not limited to one. For example, the number of marks may be reduced from both ends by one, respectively, i.e., by two. Also, for example, the number of marks may be reduced by a number corresponding to one period of a variation having a small period of the dynamic variations. Also, the number of marks Q to be formed in the second operation is not limited to the number T, which is the second combination, and may be any number smaller than the total number S. Also, the number of marks Q is not limited to the number T or larger and may be a number smaller than the number T.

The number of times of the comparison may be arbitrary. In the above illustrative embodiment, while repeating the comparison of the difference and the defined value, when the difference exceeds the defined value, the number of marks at that time is obtained. However, the number of times of the comparison may be limited to one time. For example, the difference may be calculated by reducing a plurality of marks at one time, and when the difference is smaller than the defined value, the number of marks may be reduced by a number between one or more and the plurality of marks. However, when the comparison is repeated in a plurality of times, it is possible to determine a more appropriate number.

In the above-described illustrative embodiment, the mark-number determination processing is executed by using the different defined values for each color and the positional deviation correction value is calculated for each color. However, the present invention is not limited thereto. For example, a defined value common to the respective colors may be used. Alternatively, a positional deviation correction value may be obtained for one color, and the correction may be performed for the other colors on the basis of the correction value. However, it is preferably to obtain the different correction values for each color because there is a high possibility that the correction will be performed with higher precision. Also, the present invention can be applied to an image forming apparatus for only a monochrome image. In this case, only one defined value is prepared.

The positional deviation value, which is obtained on the basis of the detection result of the mark sensor 61, may be any value corresponding to the positional deviation. For example, the positional deviation value may be replaced with a difference between a detection time of the mark Q and a reference time.

The processing disclosed in the illustrative embodiment may be executed by the hardware such as a single CPU, a plurality of CPUs and an ASIC or a combination thereof. Also, the processing disclosed in the illustrative embodiment may be implemented in a variety of aspects such as a recording medium having a program for executing the processing recorded therein and a method.

What is claimed is:

1. An image forming apparatus comprising:
an image forming device configured to form an image;
a conveyance member configured to convey the image formed by the image forming device;
a sensor configured to detect the image to be conveyed by the conveyance member; and
a control device configured to:
control the image forming device to form a pattern image for positional deviation correction, the pattern image being configured by a plurality of marks;
obtain a deviation value of an image formation position on the basis of a detection result of the pattern image detected by the sensor; and
determine a number of marks of the pattern image to be formed next time or later, comprising:
calculating a difference between a first deviation value, which is a deviation value obtained from a first combination of combinations of the marks configuring the pattern image, and a second deviation value, which is a deviation value obtained from a second combination of which a number of the marks is smaller than the first combination;
determining whether the difference between the first deviation value and the second deviation value is smaller than a defined value; and
in response to determining that the difference between the first deviation value and the second deviation value is smaller than the defined value, determining the number of marks of the pattern image to be formed next time or later to a number that is smaller than the number of the marks of the first combination.

2. The image forming apparatus according to claim 1, wherein the control device is configured to reduce a mark positioned at an upstream or downstream end with respect to a conveying direction of the pattern image in a case of forming the pattern image in the next controlling the image forming device to form the pattern image in accordance with the number of marks determined in the determining the number of marks.

3. The image forming apparatus according to claim 1, wherein in the determining the number of marks, the control device is configured to determine a number of marks to be formed next time based on a plurality of differences using a third deviation value, which is a deviation value obtained from a third combination, a number of marks of the third combination being different from the first combination and the second combination.

4. The image forming apparatus according to claim 1, wherein in the determining the number of marks, in a case where the difference is smaller than the defined value, the control device is configured to determine the number of marks of the pattern image to be formed next time or later to a number of marks of the second combination, and wherein in the controlling the image forming device to form the pattern image, in a case where a number of marks is determined in the determining the number of marks, the control device is configured to control the image forming device to form the pattern image having the number of marks determined in the determining the number of marks with the same positional relation as the second combination.

5. The image forming apparatus according to claim 1, wherein a plurality of the image forming devices is provided, and wherein in the determining the number of marks, the control device is configured to determine the number of marks for each of the plurality of image forming devices independently.

6. The image forming apparatus according to claim 5, wherein in the determining the number of marks, the control device is configured to use different defined values for determining the number of marks for each of the image forming devices.

7. The image forming apparatus according to claim 1, wherein the control device is configured to execute the determining the number of marks upon at least one of the image forming device and the conveyance member being replaced.

8. The image forming apparatus according to claim 1, wherein the control device is configured to determine the number of marks of the pattern image to be formed next time or later to a number that is equal to or larger than the number of the marks of the second combination.

9. The image forming apparatus according to claim 1, wherein the control device is configured to set an initial value of the number of marks of the first combination of the pattern image to a number corresponding to equal to or larger than a maximum period of a positional deviation variation.

10. The image forming apparatus according to claim 1, wherein the control device is configured to set an initial value of the number of marks of the first combination of the pattern image to a number corresponding to equal to or lager than a period of a maximum amplitude of a positional deviation variation.

11. A positional deviation correction method of an image forming apparatus, the image forming apparatus comprising:
an image forming device configured to form an image;
a conveyance member configured to convey the image formed by the image forming device; and
a sensor configured to detect the image to be conveyed by the conveyance member, the positional deviation correction method comprising:
controlling the image forming device to form a pattern image for positional deviation correction, the pattern image being configured by a plurality of marks;
obtaining a deviation value of an image formation position on the basis of a detection result of the pattern image detected by the sensor; and
determining a number of marks of the pattern image to be formed next time or later, comprising:
calculating a difference between a first deviation value, which is a deviation value obtained from a first combination of combinations of the marks configuring the pattern image, and a second deviation value, which is a deviation value obtained from a second combination of which a number of the marks is smaller than the first combination;
determining whether the difference between the first deviation value and the second deviation value is smaller than a defined value; and
in response to determining that the difference between the first deviation value and the second deviation value is smaller than the defined value, determining the number of marks of the pattern image to be formed next time or later to a number that is smaller than the number of the marks of the first combination and is equal to or larger than the number of marks of the second combination.

12. The positional deviation correction method according to claim 11, wherein the method comprises reducing a mark positioned at an upstream or downstream end with respect to a conveying direction of the pattern image in a case of forming the pattern image in the next controlling the image forming device to form the pattern image in accordance with the number of marks determined in the determining the number of marks.

13. The positional deviation correction method according to claim 11,
wherein in the determining the number of marks, in a case where the difference is smaller than the defined value, the method comprises determining the number of marks of the pattern image to be formed next time or later to a number of marks of the second combination, and
wherein in the controlling the image forming device to form the pattern image, in a case where a number of marks is determined in the determining the number of marks, the method comprises controlling the image forming device to form the pattern image having the number of marks determined in the determining the number of marks with the same positional relation as the second combination.

14. The positional deviation correction method according to claim 11,
wherein the image forming apparatus is provided with a plurality of the image forming devices,
wherein in the determining the number of marks, the method comprises determining the number of marks for each of the plurality of image forming devices independently,
wherein in the determining the number of marks, the method comprises using different defined values for determining the number of marks for each of the image forming devices.

15. The positional deviation correction method according to claim 11, wherein the method comprises determining the number of marks of the pattern image to be formed next time or later to a number that is equal to or larger than the number of the marks of the second combination.

16. A non-transitory computer-readable storage medium having a computer program stored thereon and readable by a computer of an image forming apparatus, the image forming apparatus comprising an image forming device configured to form an image; a conveyance member configured to convey the image formed by the image forming device, and a sensor configured to detect the image to be conveyed by the conveyance member, the computer program, when executed by the computer, causes the computer to perform operations comprising:

controlling the image forming device to form a pattern image for positional deviation correction, the pattern image being configured by a plurality of marks;

obtaining a deviation value of an image formation position on the basis of a detection result of the pattern image detected by the sensor; and determining a number of marks of the pattern image to be formed next time or later, comprising:

calculating a difference between a first deviation value, which is a deviation value obtained from a first combination of combinations of the marks configuring the pattern image, and a second deviation value, which is a deviation value obtained from a second combination of which a number of the marks is smaller than the first combination;

determining whether the difference between the first deviation value and the second deviation value is smaller than a defined value; and in response to determining that the difference between the first deviation value and the second deviation value is smaller than the defined value, determining the number of marks of the pattern image to be formed next time or later to a number that is smaller than the number of the marks of the first combination and is equal to or larger than the number of marks of the second combination.

17. The non-transitory computer-readable storage medium according to claim 16, wherein the computer program, when executed by the computer, causes the computer to further perform an operation of reducing a mark positioned at an upstream or downstream end with respect to a conveying direction of the pattern image in a case of forming the pattern image in the next operation of controlling the image forming device to form a pattern image in accordance with the number of marks determined in the operation of determining the number of marks.

18. The non-transitory computer-readable storage medium according to claim 16, wherein in the operation of determining the number of marks, in a case where the difference is smaller than the defined value, the computer program causes the computer to perform an operation of determining the number of marks of the pattern image to be formed next time or later to a number of marks of the second combination, and wherein in the operation of controlling the image forming device to form the pattern image, in a case where a number of marks is determined in the operation of determining the number of marks, the computer program causes the computer to perform an operation of controlling the image forming device to form the pattern image having the number of marks determined in the operation of determining the number of marks with the same positional relation as the second combination.

19. The non-transitory computer-readable storage medium according to claim 16, wherein the image forming apparatus is provided with a plurality of the image forming devices, wherein in the operation of determining the number of marks, the computer program causes the computer to perform an operation of determining the number of marks for each of the plurality of image forming devices independently, and wherein in the operation of determining the number of marks, the computer program causes the computer to perform an operation of using different defined values for determining the number of marks for each of the image forming devices.

20. The non-transitory computer-readable storage medium according to claim 16, wherein the computer program causes the computer to perform an operation of determining the number of marks of the pattern image to be formed next time or later to a number that is equal to or larger than the number of the marks of the second combination.

* * * * *